(12) United States Patent
Jayapalan et al.

(10) Patent No.: US 12,057,128 B1
(45) Date of Patent: Aug. 6, 2024

(54) SYSTEM AND METHOD FOR ENHANCED TRUST

(71) Applicant: UIPCO, LLC, San Antonio, TX (US)

(72) Inventors: Vijay Jayapalan, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 244 days.

(21) Appl. No.: 17/458,770

(22) Filed: Aug. 27, 2021

Related U.S. Application Data

(60) Provisional application No. 63/071,554, filed on Aug. 28, 2020.

(51) Int. Cl.
| | |
|---|---|
| *G10L 17/06* | (2013.01) |
| *G06F 21/32* | (2013.01) |
| *G10L 25/24* | (2013.01) |
| *H04L 9/08* | (2006.01) |
| *H04L 9/30* | (2006.01) |
| *H04L 9/32* | (2006.01) |

(52) U.S. Cl.
CPC .............. *G10L 17/06* (2013.01); *G06F 21/32* (2013.01); *G10L 25/24* (2013.01); *H04L 9/0819* (2013.01); *H04L 9/30* (2013.01); *H04L 9/3231* (2013.01)

(58) Field of Classification Search
CPC ......... G10L 17/06; G10L 25/24; G06F 21/32; H04L 9/0819; H04L 9/30; H04L 9/3231
See application file for complete search history.

(56) References Cited

U.S. PATENT DOCUMENTS

| | | | |
|---|---|---|---|
| 2019/0378142 A1* | 12/2019 | Darnell | ............... H04L 63/0861 |
| 2020/0052906 A1* | 2/2020 | Cahill | ................... H04L 9/3231 |
| 2020/0058022 A1* | 2/2020 | Ma | ..................... G06Q 20/3678 |
| 2020/0119922 A1* | 4/2020 | Bingham | ................ G06F 21/36 |
| 2021/0042294 A1* | 2/2021 | Srivastava | ............. G16H 40/20 |
| 2023/0112622 A1* | 4/2023 | Jun | ........................ G06F 21/32 |
| | | | 704/232 |

* cited by examiner

*Primary Examiner* — Farid Homayounmehr
*Assistant Examiner* — Brian William Avery
(74) *Attorney, Agent, or Firm* — Plumsea Law Group, LLC

(57) ABSTRACT

A system and method for publishing encoded identity data that uses at least biometric information as well as non-biometric identity and/or authentication data is disclosed. The system and method can be used for verifying a user's identity against the published encoded identity data on a distributed system, such as a distributed ledger or blockchain. Using this system, a user's identity can be verified efficiently by multiple parties, in sequence, or in parallel, as a user need only enroll in the verification process a single time. The system further includes a biometric enrollment sub-system that allows for a highly secure method of verifying a user based on unique biometric signals, such as features extracted from an audio voice signal.

20 Claims, 9 Drawing Sheets

SYSTEM AND METHOD FOR ENHANCED TRUST

CROSS-REFERENCE TO RELATED APPLICATION

This application claims the benefit of U.S. Provisional Patent Application Ser. No. 63/071,554 filed on Aug. 28, 2020 and titled "System and Method for Enhanced Trust", the disclosure of which is incorporated by reference in its entirety.

TECHNICAL FIELD

The present disclosure generally relates to identity verification, and in particular to using distributed systems to perform identity verification.

BACKGROUND

Businesses that provide services to customers may require customers to verify their identity in order to process various kinds of requests or transactions. Identity verification is typically performed on a business-by-business basis. That is, each business or organization has a vertically integrated verification system (which could be operated by a third party) that verifies the user for that particular business. In many situations where there is a partnership or overlap between different services provided by different businesses, a customer may have to have their identity verified independently by two or more different businesses using different verification processes. Currently, there is no efficient way for a user to have their identity simultaneously verified by two or more businesses.

There is a need in the art for a system and method that addresses the shortcomings discussed above.

SUMMARY

In one aspect, a method of securely generating digital identity information and storing the digital identity information on a distributed ledger includes steps of receiving an enrollment request associated with a user, receiving an audio sample of the user's voice, the audio sample including a speech signal, and processing the speech signal to extract a speech signal feature. The method also includes steps of receiving identity information for the user, generating an encoded identity using at least the identity information and the extracted speech signal feature, storing, on the distributed ledger, at least the encoded identity and information about the speech signal, and provisioning a verification smart contract on the distributed ledger, where the verification smart contract can be invoked, with a new audio sample and at least some of the identity information, to verify the user.

In another aspect, a method of securely verifying identity information using a distributed ledger includes steps of receiving an identity verification request for a user from a requesting party, and receiving an audio sample and identity information associated with the user. The method further includes steps of invoking, using the identity information and the audio sample, a verification smart contract on the distributed ledger, where the verification smart contract is configured to compare information extracted from the audio sample with a set of enrolled speech signal information for the user to determine a verification result, receiving the verification result from the invoked verification smart contract, and informing the requesting party of a verification status for the user determined from the verification result.

In another aspect, a computing node in communication with other computing nodes in a distributed identify verification network includes a processor and a non-transitory computer readable medium storing a copy of a distributed ledger shared across the distributed identity verification network. The copy of the distributed ledger includes a plurality of encoded identities, where each encoded identity is generated using a set of non-biometric identity data and voice-based identity information for each user. The copy of the distributed ledger also includes enrolled speech signal information associated to each of the plurality of encoded identities, the enrolled speech signal information being unique for each of the encoded identities in the plurality of encoded identities. The copy of the distributed ledger also includes a verification smart contract that can compare the stored enrolled speech signal information with audio information received at the time the verification smart contract is executed and return a verification result.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
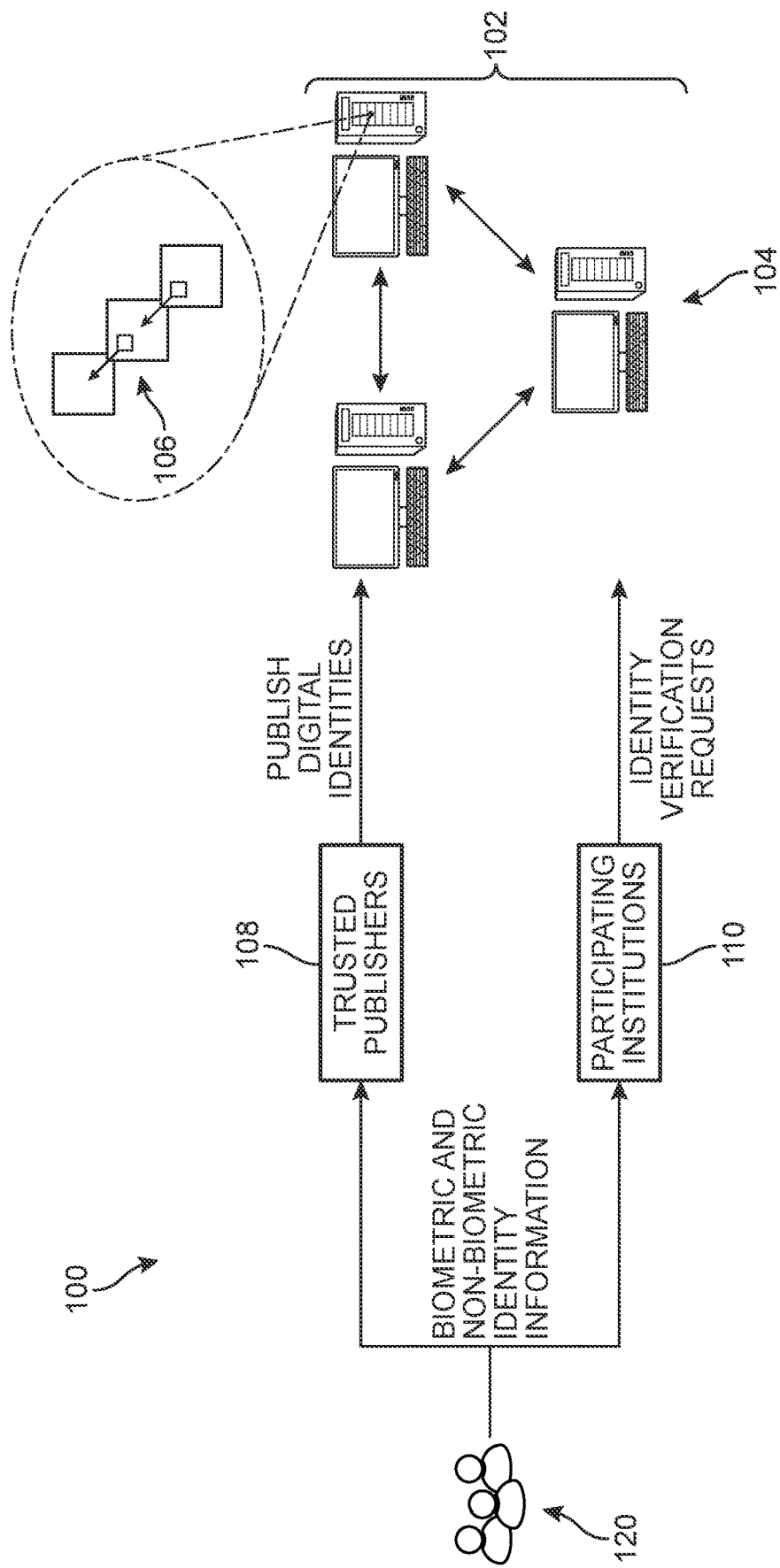
FIG. 1 is a schematic view of an distributed identity verification environment, according to an embodiment.

The embodiments provide a system and method for distributed identity verification.

Conventional identity verification systems require identity verification to be vertically integrated into a business or organization, thus requiring customers to enroll in an identity verification process for each business or service where it is required. In the context of banking, this could result in a situation where in order for a customer to have funds transferred from one bank to another, or between a bank and another business, the individual's identity must be independently verified by each party (e.g., the bank and the second business). Typically, this requires the customer to go through an independent identity enrollment process with each party, even though there is only a single transaction. Likewise, each business or organization that wants to verify a customer's identity must have an existing identity verification system in place. As an example, a bank that does not have a biometric enrollment or verification system in place may still want to be able to verify the identity of a customer who has called to speak with a representative or navigate an interactive voice response (IVR) system.

The embodiments use a distributed identity verification system in which an algorithmic digital identity is created which can be used to verify the user's identity in future transactions. In this system, each entity may perform the task of issuing the digital identity and/or verifying the digital identity.

The exemplary embodiments provide a system for publishing an encoded digital identity that uses at least biometric information as well as non-biometric identity and/or authentication data. The embodiments also provide a system for verifying a user's identity against the published digital identity on a distributed system, such as a distributed ledger or blockchain. Using this system, a user's identity can be verified efficiently by multiple parties, in sequence, or in parallel, as a user need only enroll in the verification process a single time. The system further includes a biometric enrollment sub-system that allows for a highly secure method of verifying or authenticating a user based on unique biometric signals, such as features extracted from an audio voice signal. The system also facilitates creating a secure digital identity using a hash of the extracted biometric signals and non-biometric information, thereby creating a digital identity that can be published to a public ledger or other distributed system. Identity verification can be performed using smart contracts.

The exemplary embodiments unpack existing centralized identity verification systems so that aspects of identity verification, including enrollment, digital identity generation, and verification, can all be performed using a decentralized platform.

Although the current embodiments describe methods related to voice-based biometrics, the principles could be applied to a variety of different biometric information including physical features, such as facial features, fingerprints, and physiological features such as heartbeat information, genetic markers, behavioral patterns, or other types of biometric information.

As part of the exemplary system, a digital identity may be created by hashing together features extracted from biometric information and meta information about a user. In some embodiments, the methods may take place within the context of a distributed ledger. As used herein, the term "distributed ledger" refers to a database or other store of information distributed across two or more different computing systems (or nodes). In some embodiments, a blockchain may be used. As used herein, the term "blockchain" refers to a particular type of distributed ledger. A blockchain is a growing list of records in which records are organized into blocks. Each block contains a cryptographic hash of the previous block along with a timestamp. This helps prevent data modification after the records have been recorded. In some embodiments, a blockchain may be maintained as part of a peer-to-peer network.

The exemplary system may utilize so-called "smart contracts". These are computer programs (or algorithms) that may automatically execute, control, or document information according to an existing contract. In the context of blockchains, smart contracts may utilize data already recorded on the blockchain ("on-chain data") or data from an external source ("off-chain data"), for example, using an oracle to pass data from outside the blockchain.

As one example of the exemplary system, a customer of a first bank may want to have funds transferred from that bank to a second bank. The nature of the transaction may be such that both banks require the customer to have his identity verified. The customer would like to do this without having to enroll in a separate identity verification program for both banks, and then perform an identity verification check independently for each bank. Using the exemplary systems and methods, a customer could enroll in a distributed identity verification system at an earlier time. Then, when the banks request identity verification, the customer could submit a biometric sample (such as an audio recording) during a conversation with representatives from both banks. Each bank can then capture the biometric sample and check for an enrolled digital identity signal that matches the biometric sample, using smart contracts. Using a blockchain as the distributed system, invoking a smart contract may deploy one or more nodes on the blockchain that will perform the work required to verify the sample data against an enrolled identity. If there is a matching identity the customer's identity is verified.

FIG. 1 is a schematic view of a distributed identity verification environment 100 ("environment 100"), which may also be referred to as a distributed identity verification network. Environment 100 includes a blockchain network 102, comprising computing nodes 104 that maintain and operate on a blockchain 106, which is distributed across computing nodes 104.

As seen in FIG. 1, various parties can interface directly with blockchain 106. These include trusted publishers 108 and other participating institutions 110. As used herein, the term "trusted publisher" refers to any individual or institution who can publish new digital identities to blockchain 106. In some cases, trusted publishers 108 may not be individuals publishing their own identities, but could be institutions (such as a bank) publishing identities on behalf of a customer, member, or other user.

Participating institutions 110 may include any institutions (or individuals) that use blockchain 106 to verify an individual's identity. In some cases, trusted publishers 108 could also participate in the sense of using blockchain 106 to verify identities. However, not all participating institutions 110 need also be trusted publishers.

Environment 100 also includes users 120, such as banking customers, who can interact with both trusted publishers 108 and participating institutions 110. Specifically, a user could interact with a trusted publisher to enroll (or "publish") their digital identity to blockchain 106. After enrolling, a user could interact with any participating institution to have their identity verified using the blockchain 106. For both enrollment and verification, users 120 may provide both biometric and non-biometric identity and/or authentication information. The processes of enrollment and verification are described in further detail below.

For clarity, the trusted publishers and participating institutions are shown as existing "outside of" blockchain network 102. In some cases, these organizations could interface with blockchain network 102 through a third party, or, for example, through a selected subset of organizations that interact directly with the network. In other cases, however, any of the trusted publishers and/or participating institutions could operate computing nodes on the network. In some embodiments, all of the computing nodes of the blockchain network could be run by participating organizations, thereby making the blockchain network effectively private.

In one example, a group of banks could form a network of participating institutions and trusted publishers to facilitate distributed identity verification of banking customers. In such an embodiment, one or more banks in the group could function to enroll customers into the system, and any bank in the group can use the system to verify customer identities. This would allow for a system where customers only need to enroll in one single verification system (or network), and a bank can verify any customer's identity with an enrolled digital identity, even if the customer enrolled in the system via another bank.

Figure 2:
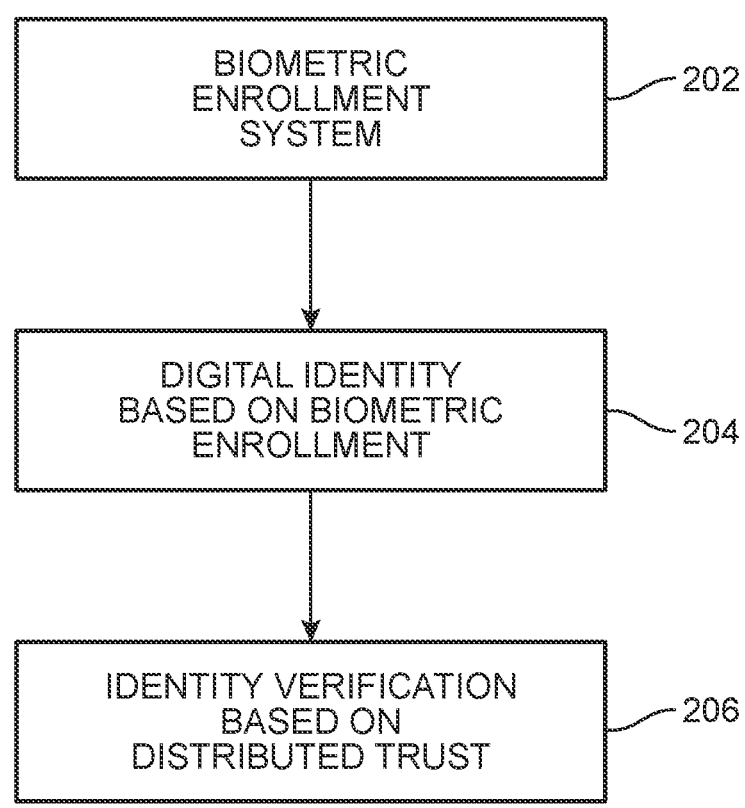
FIG. 2 is a schematic view of several high level components comprising a distributed verification system, according to an embodiment.

FIG. 2 illustrates a schematic view of some high-level components, or processes, of the exemplary system. These include a biometric enrollment component 202, a digital identity generation component 204, and an identity verification component 206. Biometric enrollment component 202 may comprise systems and processes that facilitate capturing biometric features of a user's voice, physical appearance (such as facial features), fingerprints, or other suitable biometric information that can be used as an identity marker. Digital identity generation component 204 comprises systems and processes that issue or "publish" the user's digital identity to a distributed ledger that can be accessed by other parties seeking to verify the identity of a user. In some embodiments, the digital identity can be publicly accessible. In other embodiments, the digital identity may only be accessible privately, such that any parties attempting the access the digital identity must be authorized. Identity verification component 206 may comprise components to perform identity verification once the digital identity has been created and issued/published.

As mentioned, capturing an audio signal as a biometric sample could be done in the context of an existing interaction between a user (for example, a customer) and a business or organization. For example, a user may call in to a customer service representative, and the representative may ask them to repeat some phrase or verbally acknowledge consent to have their identity (including biometric markers, such as biometric markers of their voice) captured, analyzed, and stored on a distributed ledger. This audio clip of the user speaking may then be recorded and used as input for identity generation and verification.

Figure 3:
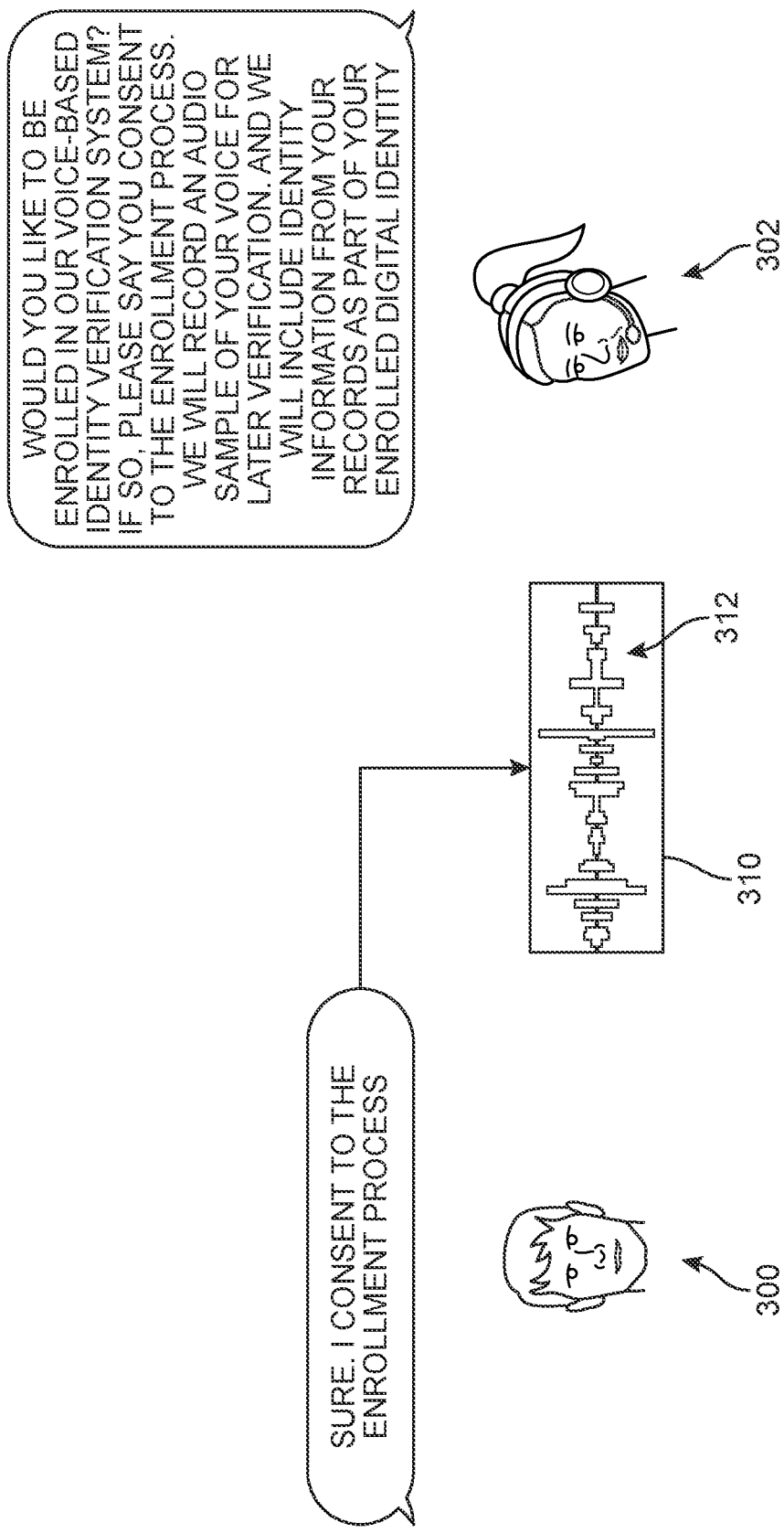
FIG. 3 is a schematic view of a scenario where identity information for a customer is enrolled on a distributed ledger during a phone call, according to an embodiment.

FIG. 3 is a schematic view of a scenario where a customer consents to having their voice captured as part of an identity enrollment and verification system. As shown, the enrollment process can occur in the context of an ongoing conversation between a customer and a customer service representative. This is possible because voice-based biometric data can be easily captured over the phone, as opposed to some other kinds of biometric data, such as fingerprints.

In FIG. 3, having completed a recent transaction with a customer 300, a customer service representative 302 asks if customer 300 would like to be enrolled in the company's voice-based identity verification system. Representative 302 requests the customer's consent, and explains the specific information that will be stored and used for enrollment and later verification. These include an audio sample of the customer's voice and identity information for the customer already stored in the bank's records. Alternatively, in some cases, during this enrollment process additional identity information could be requested from the user.

Customer 300 responds affirmatively to the question, stating "I consent to the enrollment process." As this statement can be captured by the system and stored as an audio file 310 with an embedded speech signal 312, this statement by customer 300 serves as both consent to enrollment, and a submission of data for enrollment (a voice sample). Thus, by using voice-based biometric markers, the exemplary system provides increased efficiency in the identity enrollment process.

Figure 4:
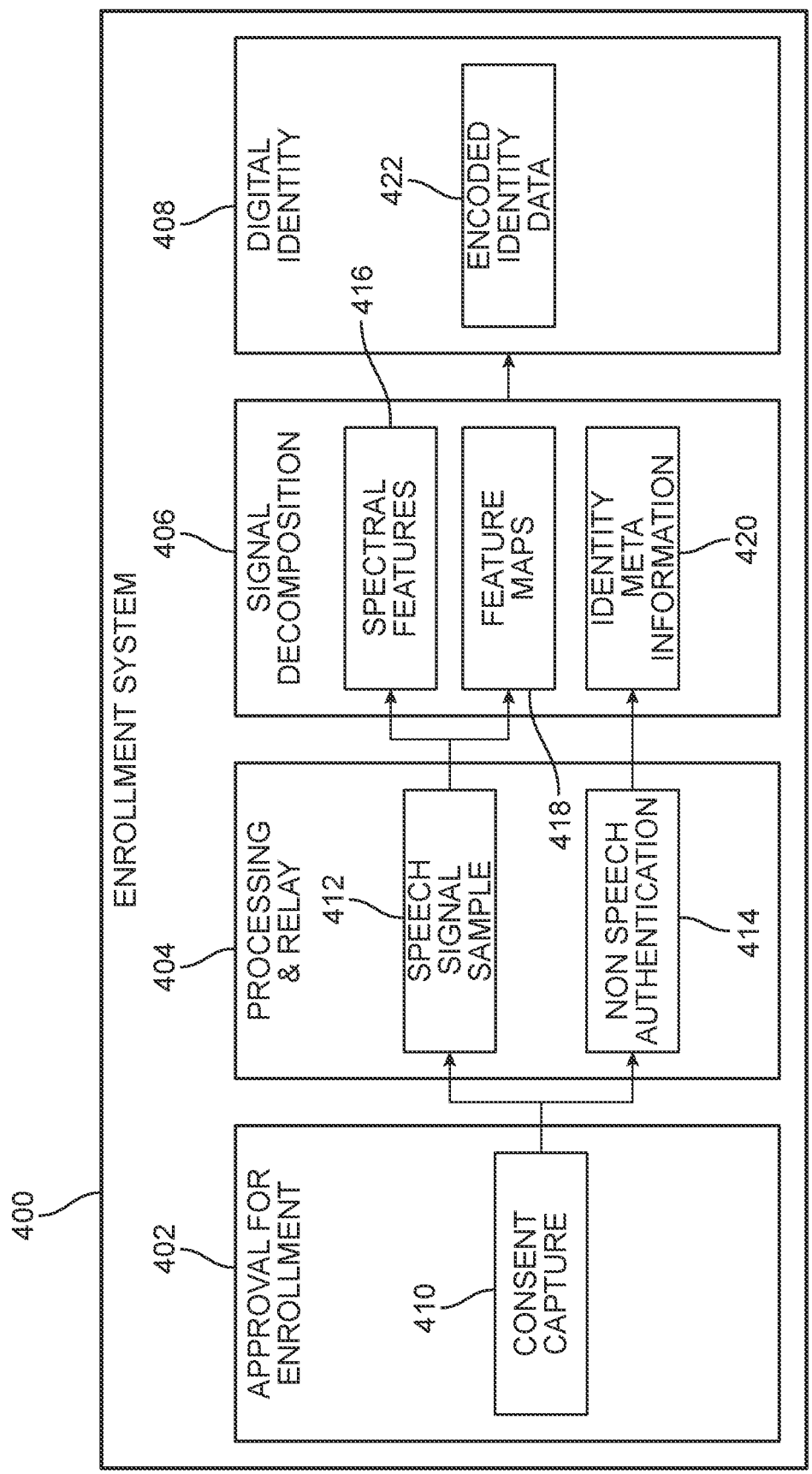
FIG. 4 is a schematic view of processes associated with generating a digital identity that can be used for future verification, according to an embodiment.

Once the system has captured a biometric sample (voice data), the system can process the sample and, along with other non-biometric identity and/or authentication information, generate encoded identity data that can be stored on the blockchain. Referring to FIG. 4, an enrollment system 400 includes components for retrieving biometric information (along with a user's consent), extracting the appropriate biometric signals or features that can be used for later verification, and encoding those features as a digital identity that can be shared in a distributed system. In this particular embodiment, the system uses voice information as the biometric information for enrollment and verification.

At a high level, these various components can be seen as stages in a process comprising approval for enrollment 402, processing and relay 404, signal decomposition 406, and digital identity creation 408. More specifically, approval and enrollment begin with consent capture 410. This includes capturing the user's consent in the form of an audio clip. For example, the system could ask the user to state a phrase or sentence indicating their consent to enroll in the present distributed identity verification system. Thus, the audio clip provides both a record of consent as well as a biometric (voice) sample, as previously discussed and shown in FIG. 3.

Once consent has been captured, a speech signal sample 412 is captured from any audio clip. In addition, one or more kinds of non-speech authentication data 414 may be retrieved. Non-speech authentication information (and/or non-speech identity information) may include information that may already be known about the user based on previous and/or current interactions. Examples include, but are not limited to: phone numbers, membership numbers, names, addresses, as well as other suitable information. Non-speech authentication information could be retrieved from a user directly, or from other sources of stored information.

Signal decomposition includes extracting spectral features 416 from the signal. These features may include any consistent or stable patterns in the voice data that may identity and/or distinguish the user's voice. An exemplary method for feature extraction for audio signals is described below and shown in FIG. 5. Additionally, feature maps 418 may be constructed from the speech signal sample. Non-speech authentication data 414 can also be used to generate identity meta information 420.

Together, spectral features 416, feature maps 418, and identity meta information 420 can be combined to create encoded identity data 422. In one embodiment, these inputs can be hashed together to generate the encoded identity data 422. Specifically, the hashing applies an irreversible function to the inputs so that the biometric information and other identity information cannot be extracted from the output data in any time frame available to a would-be attacker. In other embodiments, other encodings of the data could be used to create encoded identity data.

Figure 5:
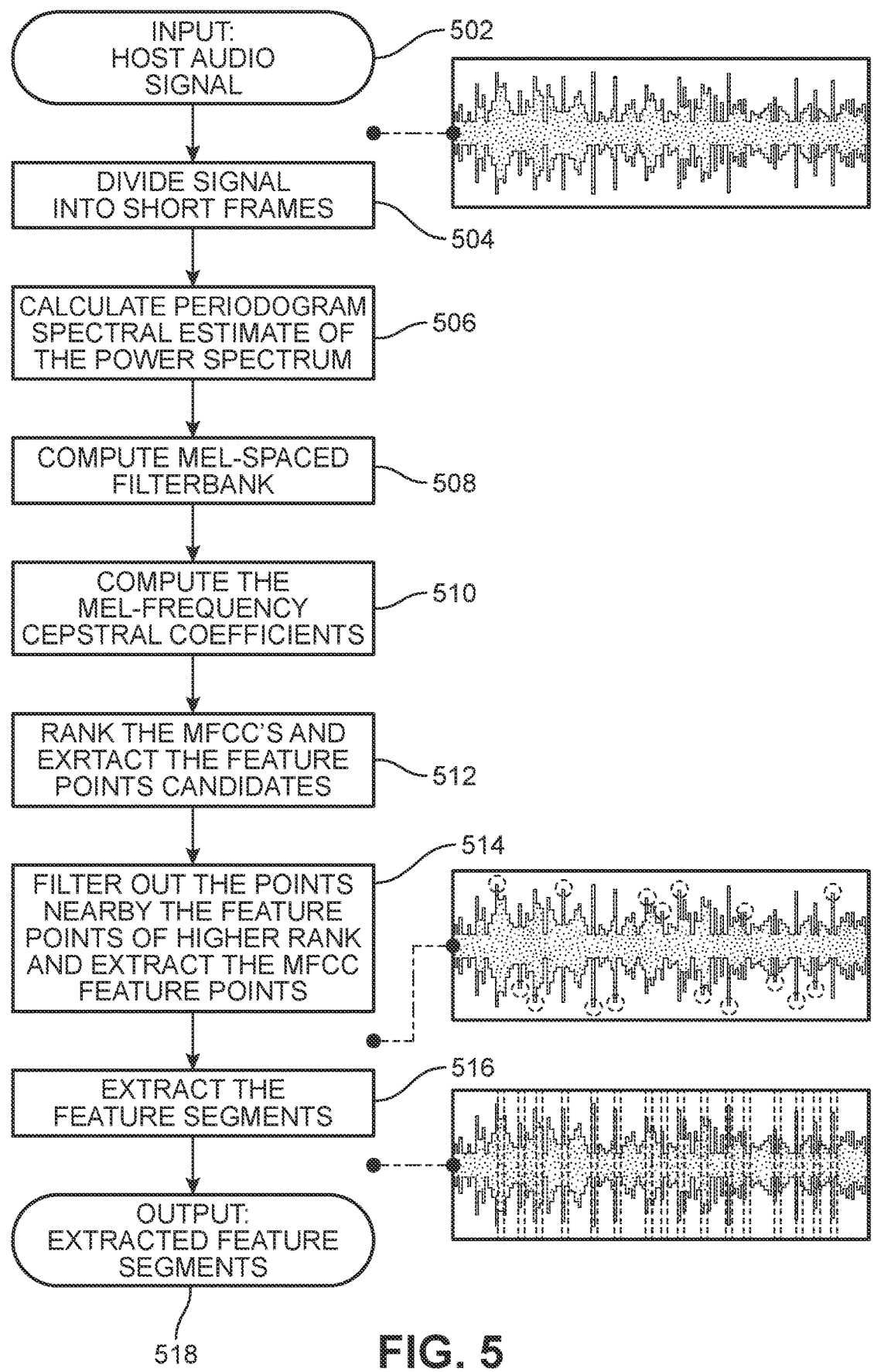
FIG. 5 is a schematic view of a process of extracting features from a voice signal for use with a verification system, according to an embodiment.

An exemplary process for computing extracted features is shown in FIG. 5. Specifically, the process begins with an input audio signal in step 502. The signal is divided into short frames in step 504. Next, the system calculates the periodogram spectral estimate of the power spectrum in step 506. Following this, the mel-spaced filterbank is calculated in step 508. From this the mel-frequency cepstral coefficients can be computed in step 510. The resulting cepstral coefficients correspond to coefficients from a transform of the frequency spectrum of an audio signal.

Next, the mel-frequency cepstral coefficients (MFCCs) can be ranked and feature points candidates extracted in step 512. Nearby points can then be filtered and MFCC feature points extracted in step 514. Following this feature segments can be extracted in step 516 and finally provided as the output of the process in step 518.

It may be appreciated that the exemplary process of FIG. 5 is only intended as an example. In other embodiments, any other suitable process for extracting features from an audio or speech signal could be used.

Once the digital identity data has been created, encoded identity data can be generated and "published" to a private or public system. In an exemplary embodiment, the digital identity (or encoded identity data) may be published to a distributed ledger that includes smart contracts. In one embodiment, the distributed ledger could be a blockchain system.

Figure 6:
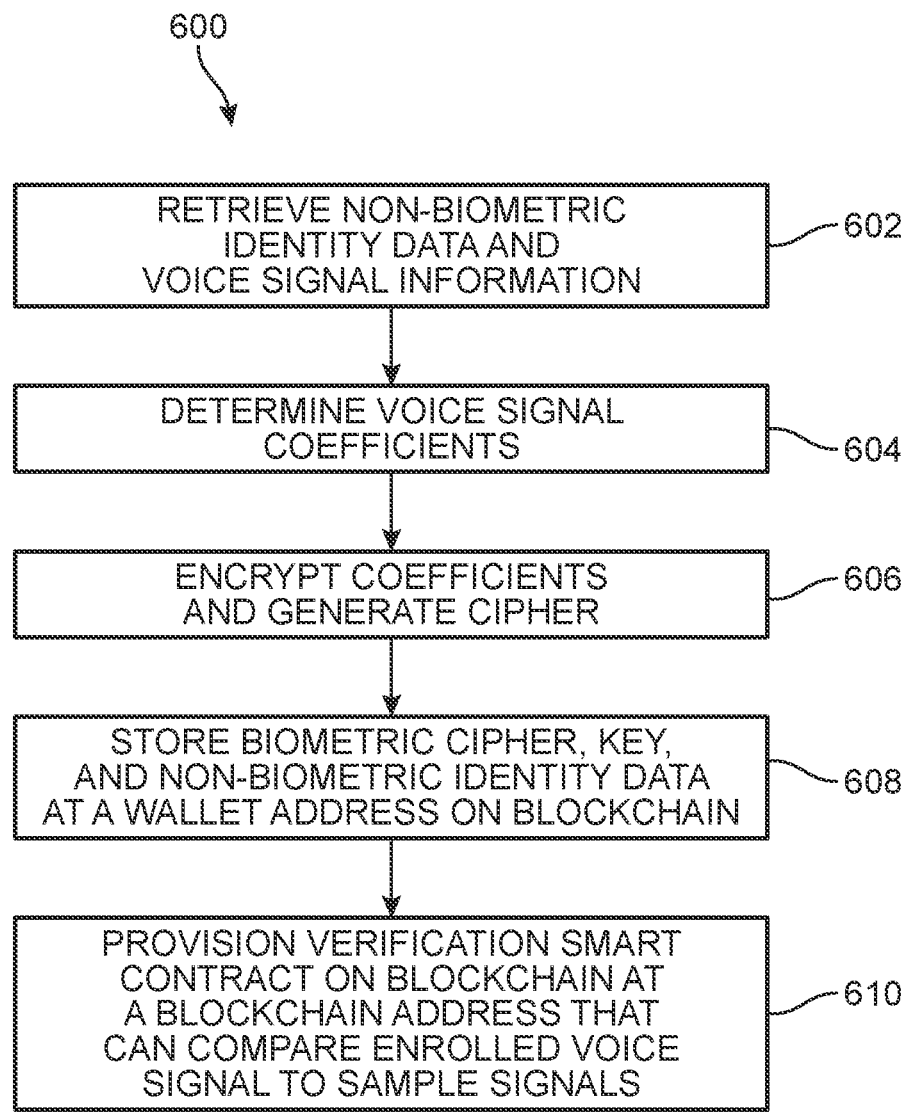
FIG. 6 is a schematic view of process for encoding and publishing a digital identity to a distributed ledger, according to an embodiment.

FIG. 6 is an exemplary embodiment of one possible method 600 for building an encoded identity for enrollment. It may be appreciated than in other embodiments, other suitable ways of generating an encoded identity could be used. In some embodiments, one or more of the following steps could be performed by a computing system operated by a trusted publisher (referred to as "publisher").

Starting in step 602, a publisher may retrieve non-biometric identity data and extracted voice signal information that has been stored at an earlier time by the publisher or another party. Next, in step 604, the publisher may determine voice signal coefficients, such as the cepstral coefficients described above. In step 606, the voice signal coefficients may be encrypted and a cipher may be generated.

In step 608, the system may store the biometric cipher generated in step 606, along with a key, and non-biometric identity data, at a wallet address on the blockchain.

In step 610, the publisher may provision a verification smart contract on the blockchain at a blockchain address. In some cases, this blockchain address is different from the address associated with the public key. The provisioned verification smart contract may be configured to compare the enrolled voice signal information with new audio samples/clips.

Figure 7:
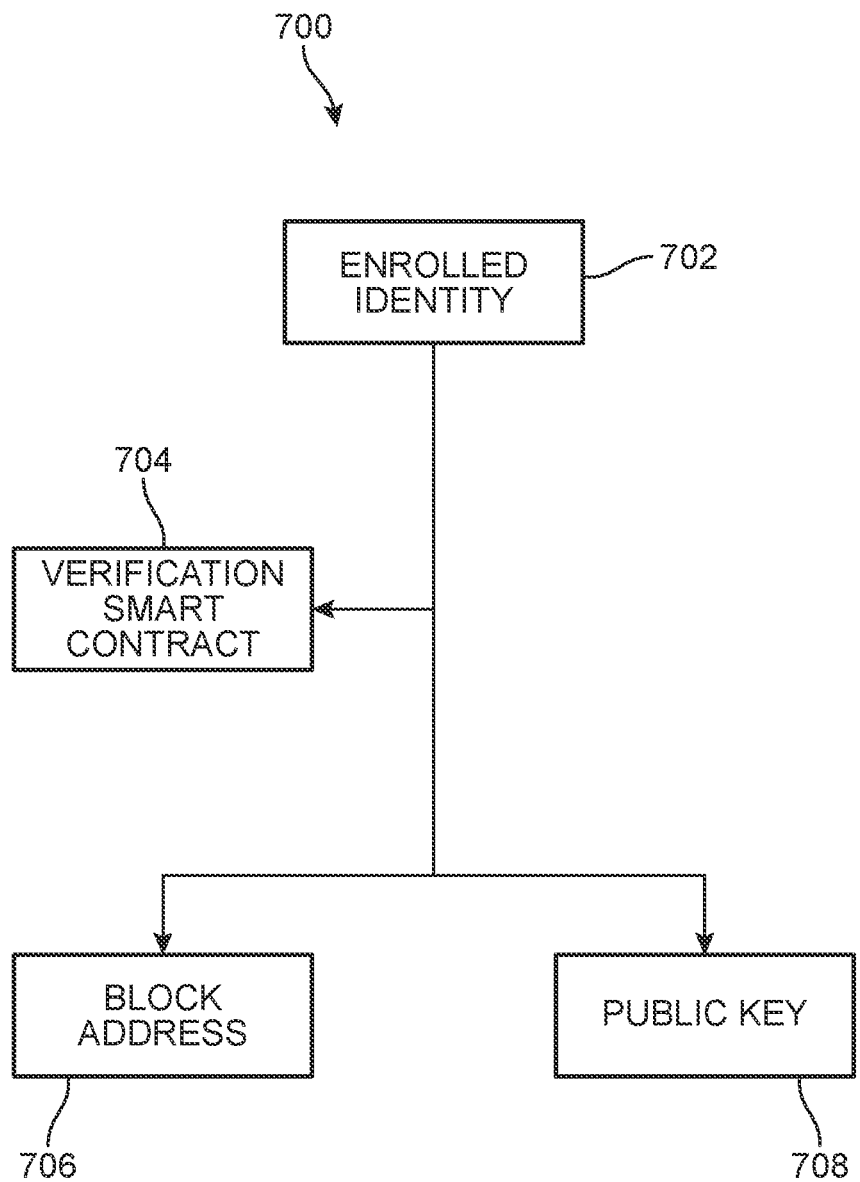
FIG. 7 is a schematic view of information that may be created for a digital identity on a distributed ledger, according to an embodiment.

FIG. 7 is a schematic view of some components that are stored on the blockchain for use in identity verification. As seen in FIG. 7, the elements of the enrolled identity (which has been encoded) and associated verification system are provided in the form of an enrolled identity 702 that is acted upon by a verification smart contract 704 that also resides on the blockchain. Public access to the enrolled identity 702 is provided via public key 708. Block address 706 may comprise an address for verification smart contract 704, and may be used to invoke the smart contract.

Figure 8:
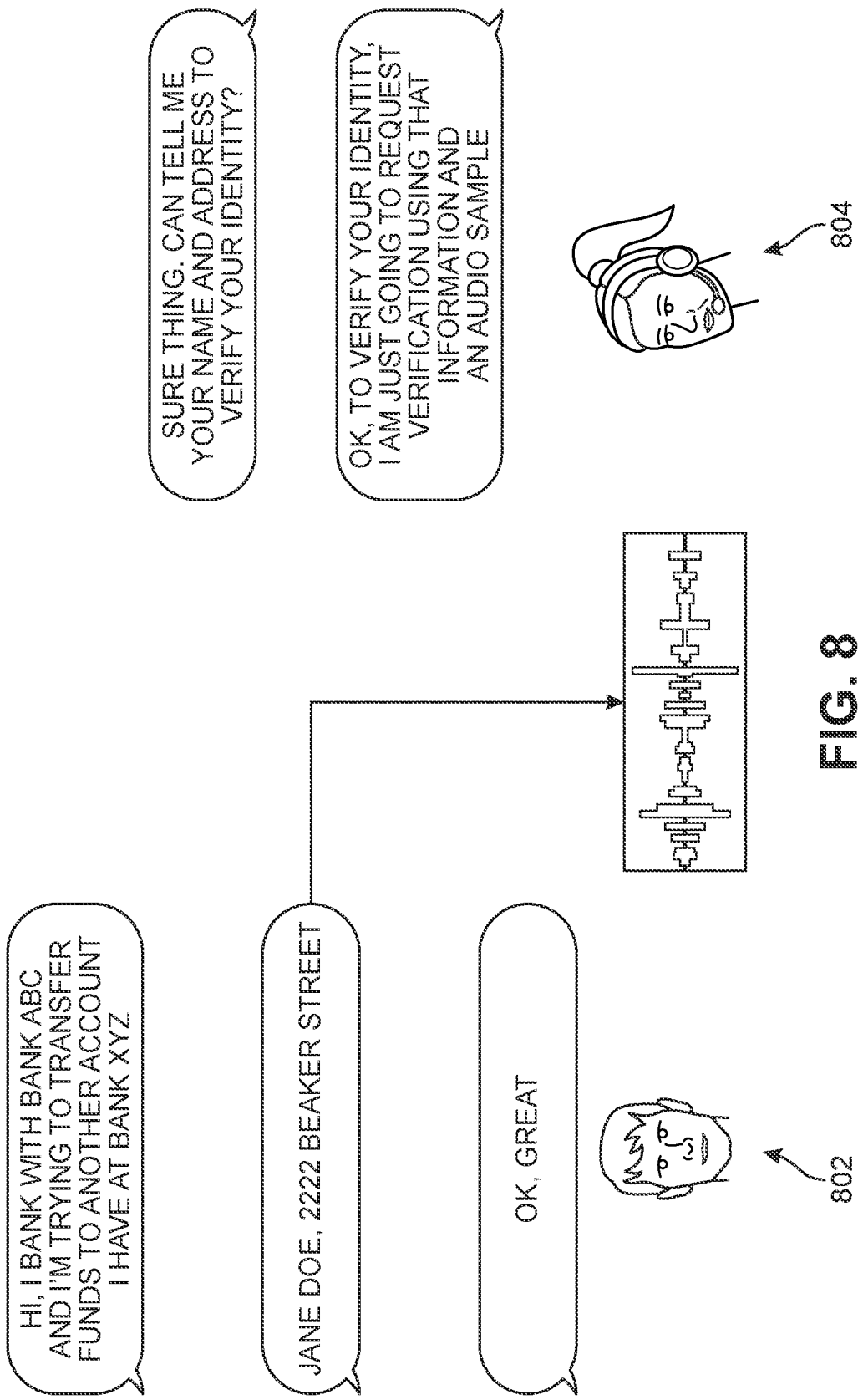
FIG. 8 is a schematic view of a scenario where a customer's identity may be verified during a phone call, according to an embodiment.

FIG. 8 is a schematic view of a scenario where a customer service representative needs to verify a customer's identity. Here, a customer 802 has accounts at a first bank ("Bank ABC") and a second bank ("Bank XYZ"), and would like to move money between those accounts. In another system that uses vertically integrated authentication systems, the customer may need to have separately enrolled in verification systems for both banks, so that their identity can be independently verified by each bank participating the funds transfer. However, in the exemplary embodiment using a distributed identity verification system, the customer can enroll in a single system and have their identity independently verified by any participating institutions.

In this scenario, customer 802 has requested a funds transfer. A customer service representative 804 asks for the customer's name and address, which the customer provides. Customer service representative 804 then confirms that they will be verifying the customer's identity using the given identity information and a recorded audio sample.

As shown, the identity verification process can occur in the context of an ongoing conversation between a customer and a customer service representative. This is possible because voice-based biometric data can be easily captured over the phone, as opposed to some other kinds of biometric data, such as fingerprints.

Figure 9:
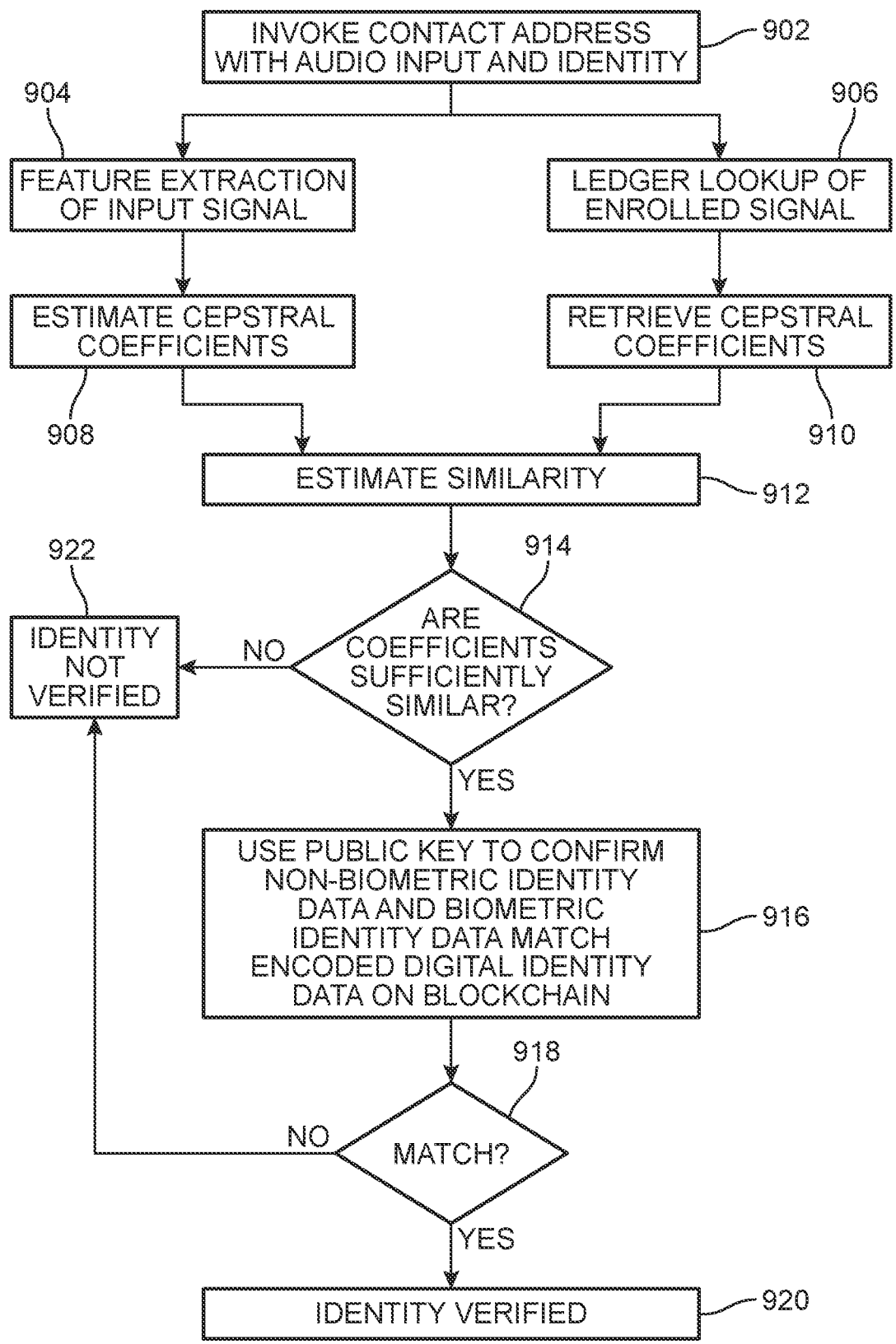
FIG. 9 is a schematic view of a process for verifying an identity using a distributed system, according to an embodiment.

FIG. 9 is a schematic view of a verification process 900 that can be invoked to verify the identity of any user who already has an enrolled digital identity on the blockchain. Starting in step 902, a verification smart contract can be invoked. As already discussed, the smart contract may be invoked using an associated blockchain address. Moreover, to invoke the smart contract, both non-biometric identity information and an audio sample must be provided to the smart contract, either via the initial request and/or through an oracle.

In step 904, the smart contract performs the necessary feature extraction analysis on the input speech signal that has been provided with the audio sample. In step 908, the cepstral coefficients for the sample speech signal may be estimated using algorithms built into the smart contract.

In parallel with step 904 and step 908, the smart contract can perform a ledger lookup of the enrolled signal that has previously been published to the ledger in step 906. As described above with respect to FIG. 6, in some cases, the enrolled signal is encoded within a biometric cipher that is stored on the ledger. Thus, during step 906, the system looks up the biometric cipher and the associated key. The biometric cipher can then be decrypted and the cepstral coefficients extracted (or retrieved) in step 910.

The smart contract may then estimate the similarity of the two sets of cepstral coefficients in step 912. That is, the system may compare the coefficients from the input information and from the published signal already on the ledger. In some cases, this comparison can be performed using a similarity matrix.

In step 914, the smart contract determines if the cepstral coefficients from the enrolled signal and the recently provided signal are substantially similar. As used herein, "substantially similar" may be defined as similar relative to a defined comparison metric or system, such as a similarity matrix. If so, in an optional step 916, the smart contract can use the known public key to confirm that the non-biometric identity data match the encoded identity data stored on the blockchain. This checks ensures that the identity information provided by the customer is authentic, thereby preventing a situation where a customer with an enrolled identity provides false non-biometric identity information to a participating institution.

In step 918, the smart contract determines if the provided identity information matches the encoded identity. If so, the system proceeds to step 920, where the verification status indicates that the identity has been verified. In some cases, such a status is associated with a "positive" verification output.

If the coefficients of the two signals are not sufficiently similar, as determined in step 914, the smart contract proceeds to step 922 where the verification status indicates that the identity has not been verified, which may be associated with a "negative" verification output. Similarly, if the enrolled digital identity information does not match the digital identity information provided at the time of the verification request, the smart contract also proceeds to step 922.

Although the embodiments described methods of identifying particular signals and patterns in voice samples for generating and verifying a digital identity, in other embodiments these same principles could be used to generate and verify digital identities using any other suitable biometrics, including physical features and/or physiological features.

It may be appreciated that the exemplary system for verifying a user's identity need not be limited to use in particular circumstances, like enabling financial transactions. In some cases, for example, these methods could be used to enable identity verification in the context of using smart systems, such as systems that allow a user to open the door to their home with their voice. Likewise, these methods could be used in any other suitable context where identity verification via voice or other biometrics is relevant.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of securely generating digital identity information and storing the digital identity information on a distributed ledger, comprising:
   receiving an enrollment request associated with a user;
   receiving an audio sample of the user's voice, the audio sample including a speech signal;
   processing the speech signal to extract a speech signal feature by:
   dividing the speech signal into short frames;
   calculating a periodogram spectral estimate of a power spectrum;
   calculating a mel-spaced filterbank; and
   using the mel-spaced filterbank to calculate mel-frequency cepstral coefficients, the cepstral coefficients corresponding to coefficients from a transform of the frequency spectrum of an audio signal;
   encrypting the cepstral coefficients in the speech signal feature;
   generating a biometric cipher for the encrypted cepstral coefficients;
   receiving non-biometric identity information for the user;
   storing, on the distributed ledger, the non-biometric identity information, the biometric cipher generated from the cepstral coefficients and a key to store the digital identity on the distributed ledger; and
   provisioning a verification smart contract on the distributed ledger, wherein the verification smart contract is invoked, with a new audio sample and the identity information, to verify the user.

2. The method according to claim 1, wherein processing the speech signal to extract a speech signal feature further comprises:
   ranking the mel-frequency cepstral coefficients;
   extracting feature points candidates; and
   filtering points near to the extracted feature points.

3. The method according to claim 1, wherein the method further includes receiving information indicating that the user has consented to the use of the audio sample in enrolling the user.

4. The method according to claim 3, wherein the audio sample includes information indicating that the user has consented.

5. The method according to claim 1, wherein the key comprises a private key and the method further includes generating a public key and the private key which corresponds to the private key.

6. The method according to claim 5, wherein generating the biometric cipher includes using the private key.

7. The method according to claim 5, wherein storing the encoded identity includes storing the digital identity at an address on the distributed ledger associated with the public key.

8. A method of securely verifying identity information using a distributed ledger, comprising:
receiving an identity verification request for a user from a requesting party;
receiving an audio sample and non-biometric identity information associated with the user;
invoking, using the non-biometric identity information and the audio sample, a verification smart contract on the distributed ledger, wherein the verification smart contract:
extracts speech signal features from the audio sample by estimating mel-frequency cepstral coefficients using algorithms built into the smart contract;
obtains non-biometric identity information, a biometric cipher and a key associated with the user that was previously stored on the distributed ledger;
decrypts the biometric cipher to extract previously obtain cepstral coefficients associated with the user; and
compares the estimated cepstral coefficients from the audio sample to the previously obtained cepstral coefficients to estimate a similarity between the estimated cepstral coefficients and the previously obtained cepstral coefficients to determine a verification result;
receiving the verification result from the invoked verification smart contract; and
informing the requesting party of a verification status for the user determined from the verification result.

9. The method according to claim 8, wherein the verification smart contract is configured to return a positive verification result when the information extracted from the audio sample is substantially similar to the set of enrolled speech signal information and wherein the verification smart contract is configured to return a negative verification result when the information extracted from the audio same is substantially different from the set of enrolled speech signal information.

10. The method according to claim 9, wherein the information extracted from the audio sample includes a first set of cepstral coefficients and wherein the set of enrolled speech signal information includes a second set of cepstral coefficients.

11. The method according to claim 9, wherein the verification smart contract uses a similarity matrix to determine if the information extracted from the audio sample is substantially similar to the set of enrolled speech signal information.

12. The method according to claim 8, wherein the method further includes retrieving the set of enrolled speech signal information from the distributed ledger.

13. The method according to claim 8, wherein the method further includes receiving a public key with the identity verification request, and using the public key to lookup an enrolled digital identity for the user on the distributed ledger.

14. The method according to claim 13, wherein the method further includes verifying the identity information using the public key and the enrolled digital identity.

15. A computing node in communication with other computing nodes in a distributed identify verification network, comprising:
a processor;
a non-transitory computer readable medium storing a copy of a distributed ledger shared across the distributed identity verification network, the copy of the distributed ledger further including:
a plurality of encoded identities, wherein each encoded identity is generated using a set of non-biometric identity data and voice-based identity information for each user;
enrolled speech signal information associated to each of the plurality of encoded identities, the enrolled speech signal information comprising a biometric cipher generated from encrypted enrolled speech signal information for each of the encoded identities by:
dividing each speech signal into short frames;
calculating a periodogram spectral estimate of a power spectrum;
calculating a mel-spaced filterbank; and
using the mel-spaced filterbank to calculate mel-frequency cepstral coefficients, the cepstral coefficients corresponding to coefficients from a transform of the frequency spectrum of an audio signal;
encrypting the cepstral coefficients in the speech signal feature; and
generating a biometric cipher for the encrypted cepstral coefficients, the biometric cipher being unique for each of the encoded identities in the plurality of encoded identities; and
a verification smart contract, the verification smart contract configured to:
compare the stored enrolled speech signal information with audio information received at the time the verification smart contract is executed; and
return a verification result.

16. The computing node according to claim 15, wherein the computing node is permissioned on the distributed identity verification network to publish new encoded identities.

17. The computing node according to claim 15, wherein the distributed ledger further includes a unique public key associated with each encoded identity.

18. The computing node according to claim 15, wherein the enrolled speech signal information includes the non-biometric identity data, the biometric cipher comprising the mel-frequency cepstral coefficients, and a key.

19. The computing node according to claim 15, wherein the enrolled speech signal information includes feature segments denoting particular regions of the enrolled speech signal, wherein the feature segments are determined using at the least mel-frequency cepstral coefficients.

20. The computing node according to claim 18, wherein the verification smart contract compares the mel-frequency cepstral coefficients with the stored enrolled speech information using a similarity matrix.

* * * * *